(12) United States Patent
Lee et al.

(10) Patent No.: US 8,466,669 B2
(45) Date of Patent: Jun. 18, 2013

(54) BUCK CIRCUIT HAVING FAST TRANSIENT RESPONSE MECHANISM AND OPERATION OF THE SAME

(75) Inventors: Chow-Peng Lee, Sinshih Township (TW); Aung Aung Yinn, Sinshih Township (TW)

(73) Assignee: Himax Analogic, Inc., Sinshih Township, Taina (TW)

( * ) Notice: Subject to any disclaimer, the term of this patent is extended or adjusted under 35 U.S.C. 154(b) by 341 days.

(21) Appl. No.: 12/916,747

(22) Filed: Nov. 1, 2010

(65) Prior Publication Data

US 2012/0105035 A1 May 3, 2012

(51) Int. Cl.
*G05F 1/40* (2006.01)

(52) U.S. Cl.
USPC ............................................. 323/284; 323/282

(58) Field of Classification Search
USPC ................. 323/222, 224, 225, 237, 240, 271, 323/272, 282–288; 363/16–20, 65, 56.12
See application file for complete search history.

(56) References Cited

U.S. PATENT DOCUMENTS

| | | | | |
|---|---|---|---|---|
| 5,397,977 A * | 3/1995 | Bahlmann | ..................... | 323/268 |
| 5,969,439 A * | 10/1999 | Johannessen | .................. | 307/106 |
| 6,577,515 B2 * | 6/2003 | Kates | .............................. | 363/65 |
| 7,492,134 B2 * | 2/2009 | Tang et al. | ..................... | 323/241 |
| 7,545,131 B1 * | 6/2009 | Alexander | ..................... | 323/284 |
| 7,570,036 B2 * | 8/2009 | Tang et al. | ..................... | 323/283 |
| 7,982,441 B2 * | 7/2011 | Crowther et al. | ............. | 323/237 |
| 7,982,445 B1 * | 7/2011 | Xin-Leblanc | ................. | 323/282 |

* cited by examiner

*Primary Examiner* — Rajnikant Patel
(74) *Attorney, Agent, or Firm* — McClure, Qualey & Rodack, LLP

(57) ABSTRACT

A buck circuit having a fast transient response mechanism is provided. The buck circuit comprises a high side MOS, a low side MOS, a transient control module and an operation control module. The low side MOS is connected to the high side MOS at a connection point for generating an output voltage to an external load according to an input voltage from the high side MOS. The operation control module controls the operation of the high and the low side MOS according to the output voltage when the external load is in a heavy load state such that the transient control module is disabled. When the external load turns from the heavy load state to a light load state such that the output voltage raises over a predetermined level, the transient control module is enabled to turn on the low side MOS for discharging to pull down the output voltage.

12 Claims, 3 Drawing Sheets

BUCK CIRCUIT HAVING FAST TRANSIENT RESPONSE MECHANISM AND OPERATION OF THE SAME

BACKGROUND

1. Technical Field

The present disclosure relates to an electronic circuit. More particularly, the present disclosure relates to a buck circuit having a fast transient response mechanism and an operation method of the same.

2. Description of Related Art

A buck circuit is a step-down DC to DC converter. The buck regulator not only regulates the ripple in the DC output, but it also steps down the DC output voltage level from that of the voltage input into the buck regulator.

The external load connected to the buck circuit may operate in a heavy load state or in a light load state. When the external load turns from the heavy load state to the light load state, the external load dissipates less current generated from the buck circuit. Consequently, the additional current that is not able to be dissipated by the external load has to be discharged. However, the process of the discharge is slow in the conventional design of the buck circuit. The large current that is not able to be dissipated may takes a long time to be discharged, which is an undesirable result.

Accordingly, what is needed is a buck circuit having a fast transient response mechanism and an operation method of the same to overcome the above issue. The present disclosure addresses such a need.

SUMMARY

An aspect of the present disclosure is to provide a buck circuit having a fast transient response mechanism. The buck circuit comprises a high side MOS, a low side MOS, a transient control module and an operation control module. The high side MOS receives an input voltage. The low side MOS is connected between the high side MOS and a ground potential, wherein the high side MOS and the low side MOS are connected at a connection point for generating an output voltage to an external load according to the input voltage. The transient control module is connected to a gate of the low side MOS. The operation control module connected to a gate of the high side MOS and connected to the gate of the low side MOS through the transient control module to control the operation of the high side MOS and the low side MOS according to the output voltage when the external load is in a heavy load state such that the transient control module is disabled. When the external load turns from the heavy load state to a light load state such that the output voltage raises over a predetermined level, the transient control module is enabled to turn on the low side MOS for discharging to pull down the output voltage.

Another aspect of the present disclosure is to provide a buck circuit operation method adapted in a buck circuit having a fast transient response mechanism. The buck circuit operation method comprises the steps as follows. An external load connected to the buck circuit is determined to be in a heavy load state. A transient control module is disabled. The operation of a high side MOS and a low side MOS is controlled according to an output voltage of the buck circuit supplied to the external load. The external load is determined to turn from the heavy load state to a light load state such that the output voltage rises over a predetermined level. The transient control module is enabled according to the raised output voltage to turn on the low side MOS for discharging to pull down the output voltage.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
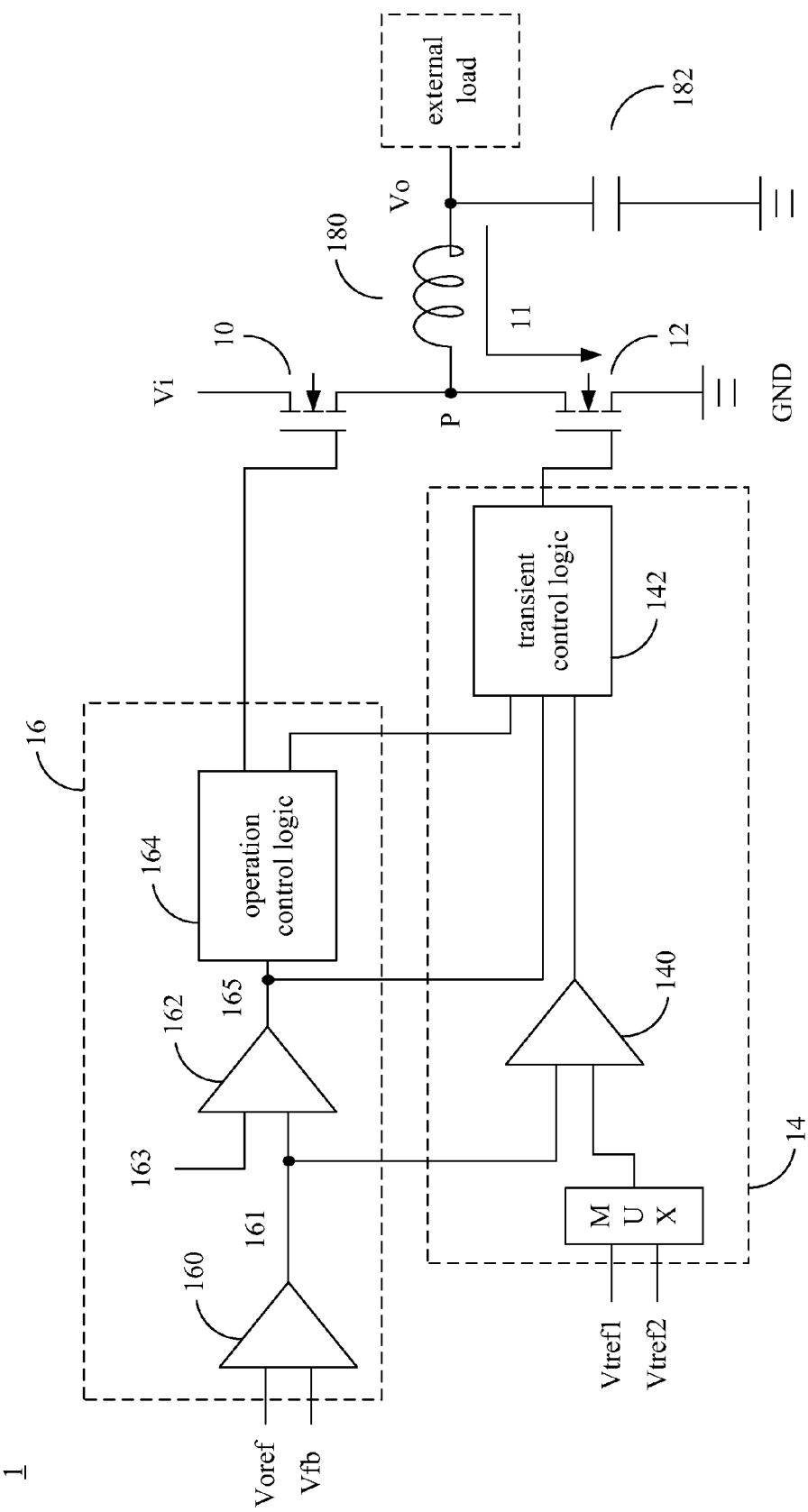
FIG. 1 is a circuit diagram of a buck circuit having a fast transient response mechanism in an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Please refer to FIG. 1. FIG. 1 is a circuit diagram of a buck circuit 1 having a fast transient response mechanism in an embodiment of the present disclosure. The buck circuit 1 comprises a high side MOS 10, a low side MOS 12, a transient control module 14 and an operation control module 16.

In the present embodiment, the high side MOS 10 is a PMOS and the low side MOS 12 is an NMOS. The source of the high side MOS 10 receives an input voltage Vi. The source of the low side MOS 12 is connected to a ground potential GND. The drain of the high side MOS 10 and the low side MOS 12 are connected together through a connection point P.

The operation control module 16 is connected to the gates of the high side MOS 10 and the low side MOS 12. In the present embodiment, the operation control module 16 is substantially connected to the gate of the low side MOS 12 through the transient control module 14.

The operation control module 16 controls the operation of the high side MOS 10 and the low side MOS 12 by controlling the gates of the high side MOS 10 and the low side MOS 12. Thus, an output voltage Vo is generated according to the turn-on and turn-off period of the high side MOS 10 and the low side MOS 12. In an embodiment, the buck circuit 1 further comprises an inductor 180 and a capacitor 182. The inductor 180 has a first end connected to the connection point and a second end connected to an external load such that the output voltage Vo generated by the high side MOS 10 and the low side MOS 12 is able to be coupled to the external load through the inductor 180. The inductor 180 provides a stabilizing mechanism on the output voltage Vo. The capacitor 182 is coupled to the second end such that the operation control module 16 can control the operation of the high side MOS 10 and the low side MOS 12 to charge the capacitor 182 to provide a sufficient current to the external load.

The operation control module 16 comprises an operation comparator 160, a pulse width modulator 162 and an operation control logic 164. The operation comparator 160 receives an operation reference voltage Voref and a feedback voltage Vfb. The feedback voltage Vfb is substantially a divided voltage of the output voltage Vo in the present embodiment. Hence, the operation comparator 160 generates a comparison result 161 that is a difference of the operation reference voltage Voref and the feedback voltage Vfb.

The pulse width modulator 162 receives an oscillating signal 163 from an oscillator (not shown) and the comparison result 161. Therefore, the pulse width modulator 162 generates a control signal 165 wherein the pulse width of the control signal 165 is generated according to the oscillating signal 163 and the comparison result 161. The operation control logic 164 further makes use of the control signal 165 to control the gates of the high side MOS 10 and the low side MOS 12. Thus, a feedback loop is formed such that the turn-on and the turn-off period of the high side MOS 10 and the low side MOS 12 can be adjusted according to the condition of the output voltage Vo.

In general, when the external load stays in a heavy load state or in a light load state for a long time, the operation condition does not change rapidly. The feedback control scheme described above is sufficient to provide a self-adjusting mechanism to deal with a slightly unstable situation. However, when the external load turns from the heavy load state to the light load state, the external load dissipates less current generated from the buck circuit. Consequently, the additional current is not able to be dissipated may takes a long time to be discharged, which is an undesirable result.

Thus, the transient control module 14 connected between the gate of the low side MOS 12 and the operation control module 16 is able to turn on the low side MOS 12 when the external load turns from the heavy load state to the light load state.

The transient control module 14 determines that the external load turns from the heavy load state to the light load state according to the comparison result 161 generated by the operation comparator 160 as well. When the external load turns from the heavy load state to the light load state, the output voltage Vo raises rapidly due to the current that is not dissipated. The raised output voltage Vo makes the feedback voltage Vfb raises too. In an embodiment, the raise of the feedback voltage Vfb makes the difference between the operation reference voltage Voref and the feedback voltage Vfb, i.e. the comparison result 161, smaller.

In an embodiment, the transient control module 14 further comprises a transient control comparator 140 and a transient control logic 142 as well. The comparison result 161 is further compared with a first transient reference voltage Vtref1 and a second transient reference voltage Vtref2 by the transient control comparator 140. When the external load turns from the heavy load state to a light load state such that the output voltage Vo raises over a predetermined level, the feedback voltage Vfb raises such that the comparison result 161 is smaller than the first transient reference voltage Vtref1. The transient control logic 142 therefore makes the low side MOS 12 turn on according to the transient control comparator 140 to form a discharging path 11 from the output end of the inductor 180 to the ground potential through the low side MOS 12. Accordingly, the current that is not dissipated at the output end of the inductor 180 can be discharged through the low side MOS 12 rapidly.

The discharging activity makes the output voltage Vo drops rapidly as well. The feedback voltage Vfb drops according to the output voltage Vo such that the value of the comparison result 161 becomes larger. In an embodiment, when the output voltage Vo drops to a specific level, the transient control comparator 140 detects that the comparison result 161 becomes larger than the second transient reference voltage Vtref2. The transient control module 14 is disabled according to the transient control comparator 140. Therefore, the operation control module 16 controls the operation of the high side MOS 10 and the low side MOS 12 again.

It's noticed that the above description is merely an example. The detail controlling scheme of the transient control module 14 and the operation control module 16 can be different in other embodiments and is not limited by the above description.

Figure 2:
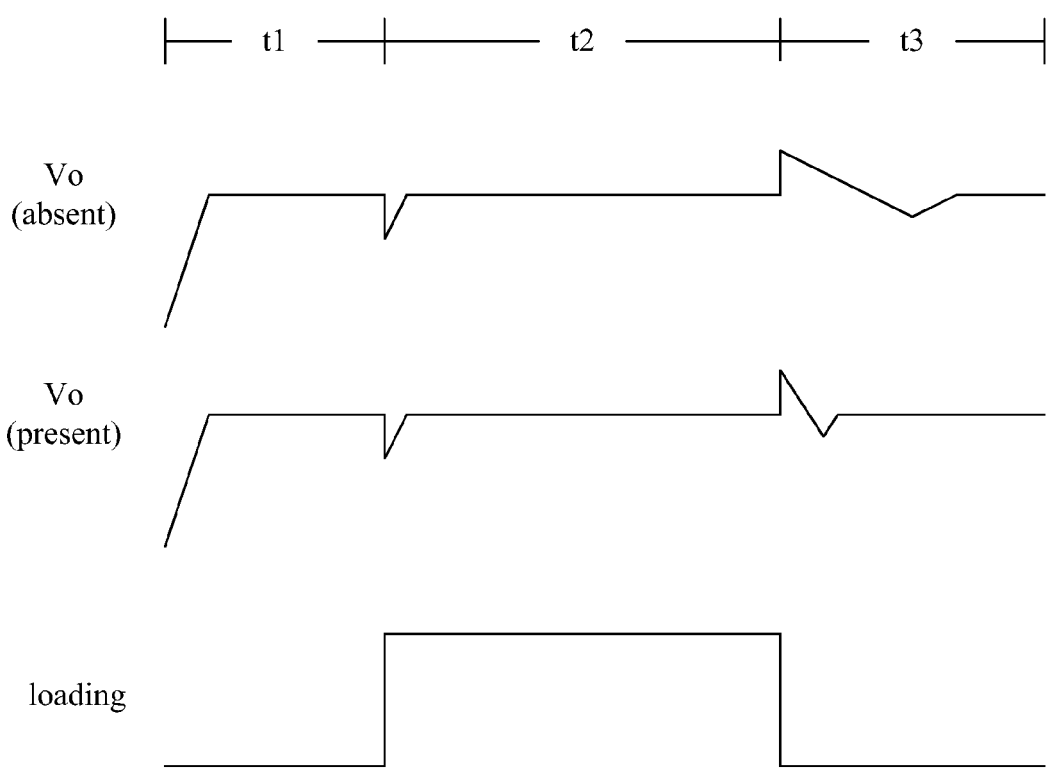
FIG. 2 is a diagram depicting the waveform of the output voltage when the transient control module is absent, the waveform of the output voltage when the transient control module is present and the loading condition of the external load.

Please refer to FIG. 2. FIG. 2 is a diagram depicting the waveform of the output voltage Vo when the transient control module 14 is absent, the waveform of the output voltage Vo when the transient control module 14 is present and the loading condition of the external load. The time slot 1 and the time slot 3 is the time period that the external load is in the light load state, where the time slot 2 is the time period that the external load is in the heavy load state. When the external load turns from the light load state to the heavy load state between the time slot 1 and the time slot 2, the output voltage Vo drops due to dissipation of the output current by the heavy load. On the other hand, when the external load turns from the heavy load state to the light load state between the time slot 2 and the time slot 3, an over-shoot condition occurs. When the transient control module 14 is absent, no additional discharging path is provided and the current takes a long time to be discharged. Therefore, the output voltage Vo decreases slowly.

However, when the transient control module 14 is present, though the over-shoot condition is unavoidable, the time that takes to discharge the current becomes much shorter due to the discharging path 11 provided by the low side MOS 12 that is controlled by the transient control module 14. The fast transient response mechanism makes the current that is not able to be dissipated by the external load discharges faster to provide a more stable operation condition.

In an embodiment, the transient control comparator 140 can use a single reference voltage such that when the comparison result 161 from the operation comparator 160 is lower than the single reference voltage, the low side MOS 12 is enabled and when the comparison result 161 from the operation comparator 160 is larger than the single reference voltage, the low side MOS 12 is disabled. However, providing two reference voltages for the transient control comparator 140 can prevent the low side MOS 12 from switching between different operating modes frequently.

Figure 3:
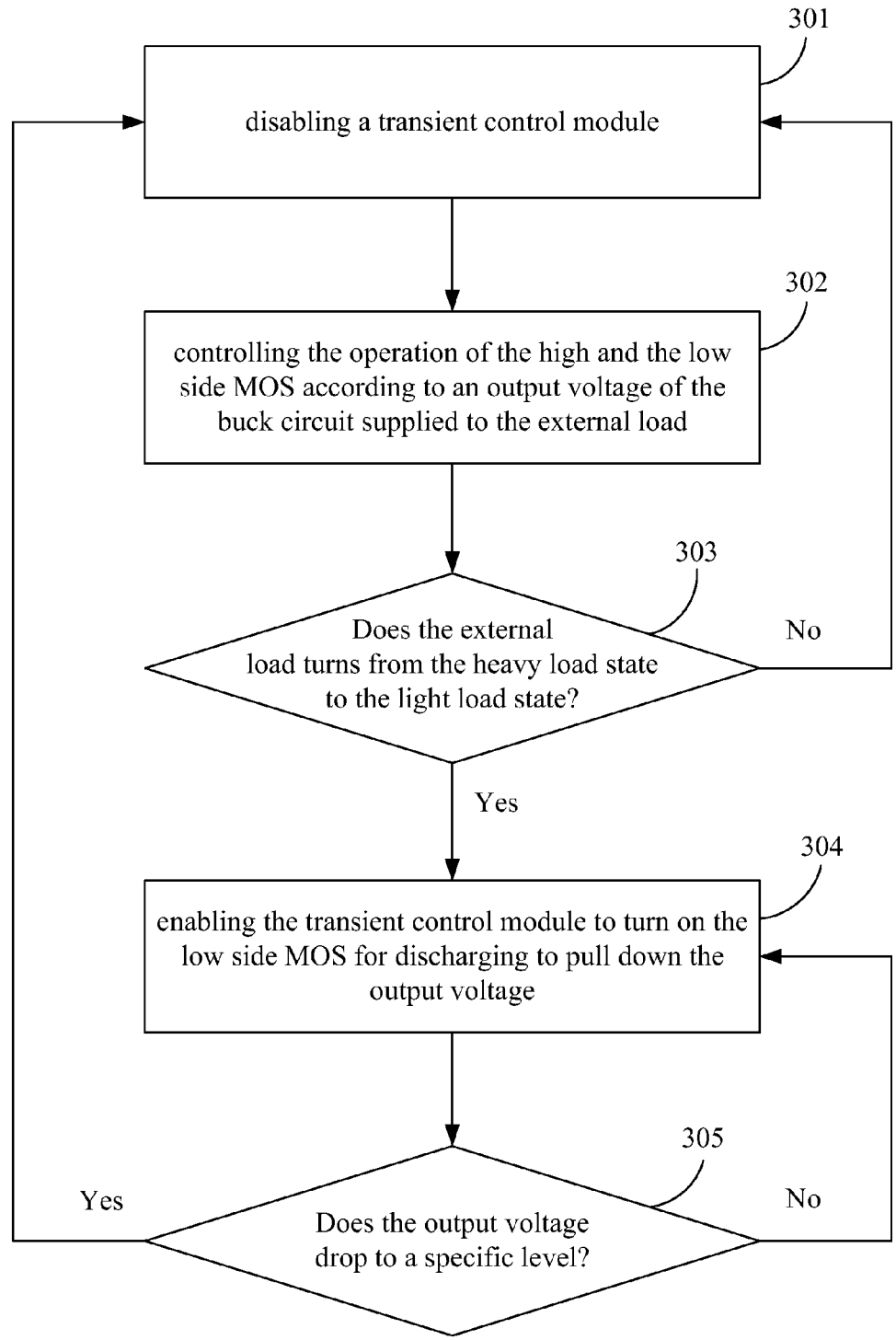
FIG. 3 is a flow chart of a buck circuit operation method in an embodiment of the present disclosure.

Please refer to FIG. 3. FIG. 3 is a flow chart of a buck circuit operation method in an embodiment of the present disclosure. The buck circuit operation method can be adapted in the buck circuit 1 having the fast transient response mechanism as depicted in FIG. 1. The buck circuit operation method comprises the steps as follows. (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

Suppose that the external load connected to the buck circuit is in a heavy load state. In step 301, the transient control module 14 is disabled. The operation of the high side MOS 10 and the low side MOS 12 is controlled according to the output voltage Vo of the buck circuit 1 supplied to the external load in step 302. In step 303, whether the external load turns from the heavy load state to the light load state such that the output voltage Vo raises over a predetermined level is determined.

When the external load does not turn from the heavy load state to the light load state, the step 301 is formed again to disable the transient control module 14. When the external load turns from the heavy load state to the light load state, the transient control module 14 is enabled according to the raised output voltage Vo to turn on the low side MOS 12 for discharging to pull down the output voltage Vo in step 304.

In step 305, whether the output voltage drops to a specific level is determined. When the output voltage does not drop to the specific level, step 304 is performed again. When the output voltage drops to the specific level, the transient control module is disabled in step 301 such that the operation control module controls the operation of the low side MOS according to the output voltage.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A buck circuit having a fast transient response mechanism comprising:
    a high side MOS to receive an input voltage;
    a low side MOS connected between the high side MOS and a ground potential, wherein the high side MOS and the low side MOS are connected at a connection point for generating an output voltage to an external load according to the input voltage;
    a transient control module comprising:
    a transient control comparator to compare a first comparison result with at least one transient reference voltage to generate a second comparison result; and
    a transient control logic connected to a gate of the low side MOS; and
    an operation control module comprising:
    an operation comparator for receiving an operation reference voltage and a feedback voltage to generate the first comparison result accordingly, in which the feedback voltage is a divided voltage of the output voltage;
    a pulse width modulator for receiving an oscillating signal and the first comparison result to generate a control signal; and
    an operation control logic connected to the gate of the low side MOS through the transient control logic and connected to the gate of the high side MOS;
    wherein when the external load does not turn from a heavy load state to a light load state, a function of the transient control logic of the transient control module is disabled according to the second comparison result, and the operation control logic controls the operation of the high side MOS and the low side MOS according to the control signal;
    wherein when the external load turns from the heavy load state to a light load state such that the output voltage raises over a predetermined level, the function of the transient control logic of the transient control module is enabled according to the second comparison result to turn on the low side MOS for discharging to pull down the output voltage.

2. The buck circuit of claim 1, wherein when the output voltage drops to a specific level, the transient control module is disabled such that the operation control module controls the operation of the low side MOS according to the output voltage.

3. The buck circuit of claim 1, wherein the first comparison result is a difference of the operation reference voltage and the feedback voltage.

4. The buck circuit of claim 1, wherein the transient control module is operative to be enabled when the value of the first comparison result is smaller than the transient reference voltage, and is operative to be disabled when the value of the first comparison result is larger than the transient reference voltage.

5. The buck circuit of claim 1, wherein the transient control module is operative to be enabled when the value of the first comparison result is smaller than a first transient reference voltage, and is operative to be disabled when the value of the first comparison result is larger than a second transient reference voltage.

6. The buck circuit of claim 1, further comprising:
    an inductor having a first end connected to the connection point and a second end connected to the external load; and
    a capacitor coupled to the second end.

7. A buck circuit operation method adapted in a buck circuit having a fast transient response mechanism, wherein the buck circuit operation method comprises the steps of:
    generating a first comparison result according to an operation reference voltage and a feedback voltage by an operation comparator of an operation control module, in which the feedback voltage is a divided voltage of an output voltage of the buck circuit supplied to the external load;
    comparing the first comparison result with at least one transient reference voltage by a transient control comparator of a transient control module to generate a second comparison result;
    generating a control signal by a pulse width modulator according to an oscillating signal and the first comparison result;
    determining that an external load connected to the buck circuit does not turn from a heavy load state to a light load state according to the second comparison result to disable a function of a transient control logic of the transient control module and control the operation of a high side MOS and a low side MOS by an operation control logic of the operation control module according to the control signal; and
    determining that the external load turns from the heavy load state to the light load state such that the output voltage raises over a predetermined level according to the second comparison result to enable the function of the transient control logic of the transient control module according to the raised output voltage and the second comparison result to turn on the low side MOS for discharging to pull down the output voltage.

8. The buck circuit operation method of claim 7, further comprising a step of disabling the transient control module when the output voltage drops to a specific level such that the operation control module controls the operation of the low side MOS according to the control signal.

9. The buck circuit operation method of claim 7, wherein the first comparison result is a difference of the operation reference voltage and the feedback voltage.

10. The buck circuit operation method of claim 7, wherein the step of determining that the external load does not turn from the heavy state to the light load state further comprising determining that the value of the first comparison result is larger than the transient reference voltage.

11. The buck circuit operation method of claim 7, wherein the step of determining that the external load turns from the heavy load state to the light load state further comprising determining that the value of the first comparison result is smaller than the transient reference voltage.

12. The buck circuit operation method of claim 7, wherein the step of determining that the external load turns from the heavy load state to the light load state further comprising determining that the value of the first comparison result is smaller than a first transient reference voltage, and the step of determining that the external load does not turn from the heavy load state to the light load state further comprising determining that the value of the first comparison result is larger than a second transient reference voltage.

* * * * *